US010179705B2

(12) United States Patent
Ryder

(10) Patent No.: US 10,179,705 B2
(45) Date of Patent: Jan. 15, 2019

(54) FEEDER AND METHOD FOR FEEDING COMPONENTS INTO AN ASSEMBLY LINE

(71) Applicant: Sensata Technologies, Inc., Attleboro, MA (US)

(72) Inventor: Matthew Ryder, Attleboro, MA (US)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 0 days.

(21) Appl. No.: 15/353,345

(22) Filed: Nov. 16, 2016

(65) Prior Publication Data

US 2018/0134499 A1    May 17, 2018

(51) Int. Cl.
| | |
|---|---|
| *B65G 47/14* | (2006.01) |
| *B65G 59/00* | (2006.01) |
| *G07F 11/00* | (2006.01) |
| *B25J 9/16* | (2006.01) |
| *B65G 47/90* | (2006.01) |

(52) U.S. Cl.
CPC ........ *B65G 47/1442* (2013.01); *B25J 9/1661* (2013.01); *B25J 9/1697* (2013.01); *B65G 47/1471* (2013.01); *B65G 47/905* (2013.01); *G05B 2219/31028* (2013.01); *G05B 2219/50386* (2013.01)

(58) Field of Classification Search
CPC .... B65D 83/04; B65G 47/1442; B25J 9/1661; B25J 9/1697; B23Q 7/12
USPC ............................................ 221/209, 163, 1
See application file for complete search history.

(56) References Cited

U.S. PATENT DOCUMENTS

| | | | | |
|---|---|---|---|---|
| 488,084 A | * | 12/1892 | Miner .................. | B65G 59/067 |
| | | | | 221/175 |
| 541,853 A | * | 7/1895 | Hart ....................... | A24F 15/10 |
| | | | | 221/142 |

(Continued)

FOREIGN PATENT DOCUMENTS

| | | |
|---|---|---|
| DE | 3822756 | 1/1990 |
| EP | 1947036 | 7/2008 |

(Continued)

OTHER PUBLICATIONS

Performance Feeders Catalogue, 12 pages, Published by Performance Feeders in the USA.

(Continued)

*Primary Examiner* — Rakesh Kumar
(74) *Attorney, Agent, or Firm* — Burns & Levinson, LLP; Joseph M. Maraia

(57) ABSTRACT

A system for presenting isolated components to an assembly line over a plurality of cycles includes a container configured to direct components towards a central axis. An elongated pedestal within the container has ribs which define an upper surface and a plurality of channels. The pedestal is reciprocally mounted to move along the central axis, and isolates components during each cycle. The isolated components are transferred to an assembly line. The number of isolated components of each cycle is measured and the value stored. A threshold value is calculated based on a number of stored values. A running average of the quantity of isolated components for a number of cycles can then be compared to the threshold to determine when to refill the component container.

15 Claims, 7 Drawing Sheets

(56) References Cited

U.S. PATENT DOCUMENTS

| | | | | |
|---|---|---|---|---|
| 1,159,195 A * | 11/1915 | Eden, Jr. | B65G 59/067 | 221/238 |
| 1,457,050 A * | 5/1923 | Abbaticchio | A24F 27/22 | 221/254 |
| 1,498,476 A * | 6/1924 | Nadwocki | A24F 15/04 | 221/248 |
| 1,696,787 A * | 12/1928 | Zelkowitz | A24F 15/04 | 221/254 |
| 2,346,863 A * | 4/1944 | Pacione | A24F 15/04 | 221/131 |
| 2,407,638 A * | 9/1946 | Gettig | B65G 47/1478 | 221/236 |
| 2,541,945 A * | 2/1951 | Smith | A24F 15/04 | 221/254 |
| 2,873,047 A * | 2/1959 | Gonzalez | A47G 21/184 | 221/192 |
| 2,935,227 A * | 5/1960 | Swartz | B65G 47/1478 | 221/179 |
| RE24,950 E * | 3/1961 | Wills | A47G 21/184 | 221/192 |
| 3,040,897 A * | 6/1962 | Holman | B65D 1/10 | 210/237 |
| 3,703,232 A * | 11/1972 | Zbiegien | B65B 35/56 | 198/383 |
| 3,982,660 A * | 9/1976 | Hashimoto | A47G 21/12 | 221/190 |
| 4,362,460 A * | 12/1982 | Peddinghaus | B65G 47/1478 | 198/443 |
| 4,457,451 A * | 7/1984 | Ichikawa | B65G 47/1407 | 221/190 |
| 4,480,765 A * | 11/1984 | Tonus | A01C 7/042 | 221/211 |
| 4,522,314 A * | 6/1985 | Nelson | A47G 21/12 | 206/380 |
| 4,573,860 A * | 3/1986 | Peddinghaus | B65G 47/1478 | 198/443 |
| 4,667,849 A * | 5/1987 | Hansen | B65D 83/02 | 221/190 |
| 4,721,230 A * | 1/1988 | McKnight | A61J 3/074 | 193/45 |
| 4,809,882 A * | 3/1989 | Neu | B65G 47/1478 | 221/238 |
| 4,828,142 A * | 5/1989 | McKnight | A61J 3/074 | 221/171 |
| 4,946,024 A * | 8/1990 | Forsberg | B65G 47/82 | 198/429 |
| 5,054,363 A * | 10/1991 | Scharch | B65B 5/08 | 198/399 |
| 5,067,631 A * | 11/1991 | Baba | B65G 47/1478 | 221/254 |
| 5,238,353 A * | 8/1993 | Kollross | A22C 15/001 | 198/803.14 |
| 5,366,334 A * | 11/1994 | Cucchi | B23B 13/02 | 414/15 |
| 5,647,472 A * | 7/1997 | Fierkens | B65G 47/1471 | 198/443 |
| 5,702,030 A * | 12/1997 | Hulscher | B23P 19/002 | 198/389 |
| 5,899,357 A * | 5/1999 | Yuyama | B65B 35/08 | 221/171 |
| 5,934,505 A * | 8/1999 | Shimada | H05K 13/028 | 198/396 |
| 6,039,209 A * | 3/2000 | Yuyama | B65G 47/1478 | 221/171 |
| 6,062,423 A * | 5/2000 | Saito | H05K 13/028 | 221/200 |
| 6,098,838 A * | 8/2000 | Saho | H05K 13/028 | 221/163 |
| 6,138,868 A * | 10/2000 | Yuyama | G07F 11/44 | 221/156 |
| 6,189,728 B1 * | 2/2001 | Yuyama | B65G 47/1471 | 221/17 |
| 6,266,864 B1 * | 7/2001 | Barber | A61M 5/32 | 221/254 |
| 6,272,955 B1 * | 8/2001 | Scemama | B23B 13/02 | 414/15 |
| 6,290,095 B1 * | 9/2001 | Saito | H05K 13/028 | 221/163 |
| 6,505,756 B1 * | 1/2003 | Walldorf | B65G 47/1471 | 221/241 |
| 6,640,428 B2 * | 11/2003 | Barber | A61M 5/32 | 221/254 |
| 6,655,547 B2 * | 12/2003 | Saito | H05K 13/028 | 221/156 |
| 6,860,694 B2 * | 3/2005 | Slettedal | E21B 19/155 | 414/22.51 |
| 7,089,654 B2 * | 8/2006 | Chiba | B23P 19/001 | 221/236 |
| 7,299,943 B2 * | 11/2007 | Itoh | B01L 9/543 | 221/242 |
| 7,504,067 B2 * | 3/2009 | Itoh | B65G 47/1478 | 156/538 |
| 7,861,889 B2 * | 1/2011 | Ishigure | B65G 47/1428 | 198/393 |
| 8,186,543 B1 * | 5/2012 | Hopwood | A47G 21/12 | 221/13 |
| 8,840,851 B2 * | 9/2014 | Kowari | G01N 35/04 | 221/10 |
| 8,915,694 B2 * | 12/2014 | Rigolone | B23B 13/02 | 414/745.9 |
| 8,967,365 B2 * | 3/2015 | Sirkett | B65G 47/19 | 198/396 |
| 9,138,090 B2 * | 9/2015 | Horian | A47G 21/184 | |
| 9,474,287 B2 * | 10/2016 | Wiemer | A22C 15/001 | |
| 9,561,908 B2 * | 2/2017 | Gross | B65G 47/1478 | |
| 2004/0108330 A1 * | 6/2004 | Itoh | B01L 9/543 | 221/289 |
| 2010/0063629 A1 | 3/2010 | Battisti et al. | | |
| 2012/0111883 A1 * | 5/2012 | Kim | B65D 83/0005 | 221/209 |
| 2015/0232255 A1 * | 8/2015 | Sirkett | B65D 83/04 | 414/304 |
| 2016/0039553 A1 * | 2/2016 | Akdogan | B25J 9/1697 | 700/240 |
| 2017/0182665 A1 * | 6/2017 | Okuyama | B25J 9/1697 | |
| 2017/0225330 A1 * | 8/2017 | Wagner | B25J 9/1664 | |
| 2017/0246745 A1 * | 8/2017 | Kobayashi | B25J 9/161 | |

FOREIGN PATENT DOCUMENTS

| | | | | |
|---|---|---|---|---|
| EP | 1947036 A1 * | 7/2008 | | B25J 9/1697 |
| FR | 2922798 | 5/2009 | | |
| FR | 2922798 B1 * | 1/2010 | | B65G 47/1471 |
| JP | 2009057060 A * | 3/2009 | | |
| JP | 2009057060 A * | 3/2009 | | B65D 83/04 |
| KR | 200449734 Y1 * | 8/2010 | | |
| KR | 200449734 Y1 * | 8/2010 | | B65D 83/04 |
| WO | WO 2011004951 A1 * | 1/2011 | | B65D 83/0005 |
| WO | WO-2011004951 A1 * | 1/2011 | | B65D 83/0005 |
| WO | WO 2014157875 A1 * | 10/2014 | | B65D 83/0038 |

OTHER PUBLICATIONS

European Search Report for European Application No. 17200472.3 dated Apr. 18, 2018, 9 pages.

* cited by examiner

FEEDER AND METHOD FOR FEEDING COMPONENTS INTO AN ASSEMBLY LINE

FIELD OF THE INVENTION

The subject disclosure relates to component assembly lines, and more particularly to the improved feeding of components into a component assembly line.

BACKGROUND OF THE INVENTION

Automatically feeding bulk-packaged components to assembly machines is the hallmark of an efficient manufacturing process. Vibratory bowl feeders, carpet feeders, step feeders, centrifugal feeders, and systems using multiple actuators have been used to separate and orient bulk-fed components.

Vibratory feeders of any kind need to be carefully tuned based on the mass, surface finish, and geometry of the parts being fed and tend to be expensive and loud. The vibrations can also transfer to other parts of the automation equipment and cause problems unless steps are taken to isolate those vibrations. When the feeder gets dirty, or if changes of any kind are made to the parts being fed, the feeder needs to be re-tuned by a specialist. These types of feeders also rely on the back pressure of multiple parts in a queue to push the front-most part forward, which sets a lower limit on the number of parts required for the feeder to operate and requires the front-most part to be removed before another can take its place. This can cause a large loss of parts during lot changeover because all the parts in the queue must be discarded. It also means a single jam will stop the assembly process.

Feeders with multiple actuators, such as step feeders, are inherently more complex due to the added parts and control systems required for their successful operation. Step feeders lift parts from a hopper of bulk material onto a conveyor in small groups where the parts can then be sorted. Although step feeders are less prone to jamming and require less tuning than vibratory feeders, step feeders struggle with very small parts because small parts are more difficult to isolate and transfer between the step and conveyor belt. The small crevices and corners present on these feeders combined with the multitude of surfaces that contact the part makes cleaning and purging these feeders time consuming, which increases the cost of capacity for an assembly line. It also makes it more difficult to identify the problem if parts get damaged or do not feed well.

Further, vision-guided pick and place operations are becoming increasingly pervasive in modern assembly lines and commercially available feeding solutions are not necessarily best equipped to handle the changing demands of these operations. Existing feeding options can be expensive, require precise tuning and adjustment, and are not easily adaptable to changes in components.

SUMMARY OF THE INVENTION

The subject disclosure overcomes the drawbacks of the prior art by providing a feeder and method for feeding components into an assembly line that is simplified, inexpensive, and easily adaptable. Further, the subject disclosure provides a feeder and method for feeding components into an assembly line that requires limited tuning and is easy to clean and handle.

In one embodiment, the subject disclosure related to a feeder for presenting components. The feeder includes a container for holding the components, the container having sloped interior walls and a passage. An elongated pedestal has ribs which define an upper surface and a plurality of channels. The pedestal is reciprocally mounted for movement through the passage along a longitudinal axis. An actuator moves the pedestal along the axis between a low position and a high position. When the pedestal is in the low position, the interior walls of the container direct the components onto the upper surface of the pedestal. As the pedestal moves from the low position to the high position, a plurality of excess components are dispersed thru the channels. When the pedestal is in the high position, a plurality of select components are isolated from the components on the upper surface. "Select components" refers to components which are properly oriented on top of the upper surface of the pedestal for transfer to another location, such as an assembly line or a welding station.

In at least one embodiment, the passage can be centered within the container. The channels can slope from a central lateral axis to an exterior of the pedestal at an angle of at least 20 degrees. In other embodiments the channels slope from the central lateral axis to the exterior of the pedestal at an angle between 25 and 30 degrees. The interior walls can have a slope of at least 35 degrees. In other embodiments, the interior walls have a slope of at least 50 degrees.

In at least one embodiment, the pedestal ribs are substantially ⅛" wide and/or the channels are substantially ¼" wide. The upper surface of the pedestal can have dimples for retaining components. In some embodiments, the upper surface has a diameter of substantially 65 mm.

The feeder can include an optical device, located above the feeder along the longitudinal axis. The optical device can have a light source for directing a colored light towards the upper surface of the pedestal. The optical device can also have an optical receiver for detecting reflections of the colored light off components on the upper surface of the pedestal.

In at least one embodiment, the subject disclosure includes a method of providing select components to an assembly line. In at least one embodiment of the method, a plurality of components are provided in a component container. An elongated pedestal is repeatedly actuated within the component container between a low position and a high position to isolate select components. A quantity of the select components are measured each cycle. A value is stored, based on the measured quantity of select components for each cycle. The stored value can be a running average of the quantity of select components. The select components are transferred to an assembly line. A predetermined threshold is calculated based on some of the stored values. A determination of whether to refill the component container is made based on whether one of the stored values is less than the predetermined threshold.

In some embodiments, the method is carried out using a pedestal which has ribs defining an upper surface and a plurality of channels. Additionally or alternatively the method can include the step of reflecting a colored light off the select components and into an optical receiver. The quantity of select components can be measured based on the colored light entering the optical receiver.

In at least one embodiment, the subject technology includes a system for presenting isolated components to an assembly line over a plurality of cycles. "Isolated components" refers to components which are properly oriented on top of the upper surface of the pedestal for transfer to another location, such as an assembly line or a welding station. The system includes a container having a passage configured to direct components towards a central longitudinal axis. An elongated pedestal, with ribs defining both an upper surface and a plurality of channels, is reciprocally mounted for movement through the passage along the axis. The pedestal is repeatedly actuated over a plurality of cycles, the pedestal presenting, during each cycle, a quantity of isolated components. One or more of the quantity of isolated components are engaged and presented to an assembly line. The system includes memory which stores an instruction set and data related to the quantity of isolated components. A processor runs the instruction set, the processor being in communication with the memory. The processor is operative to measure and store a value representing a quantity of isolated components for each cycle. The processor is also able to calculate a predetermined threshold based on one or more of the stored values. Further, the processor can calculate an average, based on a running average of the quantity of isolated components for a plurality of cycles. The processor can determine whether to refill the container based on whether the average is less than a predetermined threshold.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION OF PREFERRED EMBODIMENT

The subject technology overcomes many of the prior art problems associated with feeding components into a component assembly line. The advantages, and other features of the systems and methods disclosed herein, will become more readily apparent to those having ordinary skill in the art from the following detailed description of certain preferred embodiments taken in conjunction with the drawings which set forth representative embodiments of the present invention.

Figure 1:
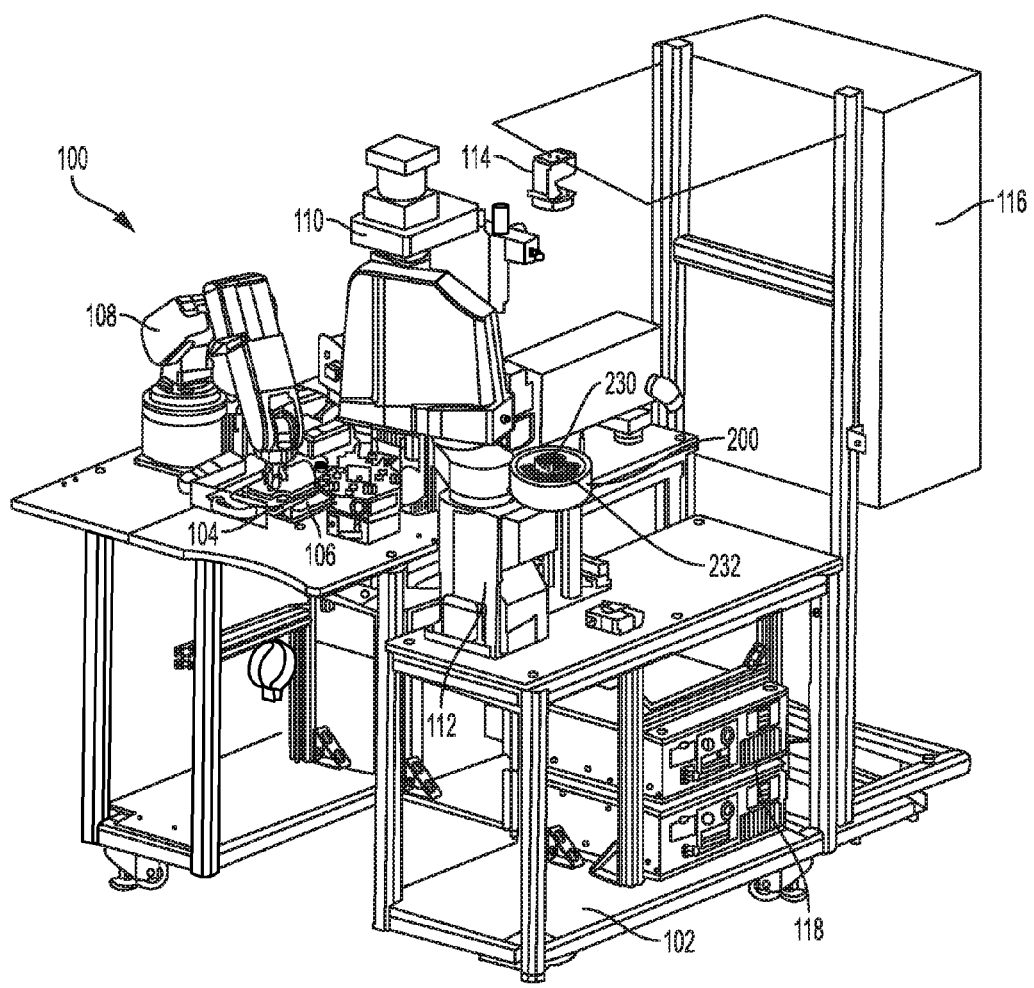
FIG. 1 is a perspective view of a work station for providing components to assembly line in accordance with the subject disclosure.

Referring now to FIG. 1, a work station for a component assembly line in accordance with the subject disclosure is shown generally at 100. The work station 100 acts to bring together two components (not shown) for assembly by welding. The work station 100 includes a two-part assembly line platform 102 for supporting a first component feeder 104. The first component feeder 104 includes a tray 106 of first components. A first robotic arm 108 transfers the first components between the tray 106 and a welding station 110.

A second feeder 200, being designed in accordance with the subject disclosure, presents second components 230,232 to a second robotic arm 112. The second robotic arm 112 transfers the second component 230,232 onto the first component at the welding station 110 for welding together. In different ways, the feeders 104, 200 work to isolate select components 230 such that the select components 230 can be provided to the welding station 110. In the following description, the first component is a sensor base and the second component 230,232 is a half ball that is welded to the sensor base. The terms "Select components", "Isolated components", and the like, refer to components which are properly oriented on an upper surface 212 of a pedestal 204 of the feeder 200 for transfer to another location, such as an assembly line or a welding station 110. For example, in the case of half ball components, properly oriented components are position such that the rounded surface is against the upper surface 212 of the pedestal 204, while the flat surface is facing up.

Referring again to FIG. 1, in the embodiment shown, the electromechanical arm 112 transfers the select components 230 using vision-guided pick and place technology. The electromechanical arm 112 may be operated by a user via a keypad, by instructions from a program or algorithm module, or by some combination thereof. In the embodiment shown, an optical device 114 is positioned directly above the feeder 200. The optical device 114 includes a light source which emits a colored light (i.e. red) and an optical receiver which detects only light that is of the same color as the emitted colored light (i.e. only red light). In this way, the optical device 114 emits a colored light onto components 230 isolated by the feeder 200, as discussed more fully herein. Reflection and detection of the colored light off of the isolated components 230 allows the robot arm 112 to pick the desired components 230 using a vacuum. By using a colored light rather than a standard light, the optical device 114 reduces interference from outside light sources.

An electronics cabinet 116 maintains a number of items to facilitate the operation of the work station 100. Additional processing and capabilities are also provided, for example, in the form of processing modules, computers, servers and the like as shown generally at 118. Typically, the supporting electronics are application specific hardware for running the arms 108, 112, the welding station 112, the optical device 114, the feeders 104, 200, user interface (not shown) and other components as would be appreciated by those of ordinary skill in the art. More particularly, the cabinet 116 may contain a processor, which is generally logic circuitry that responds to and processes instructions. The processor can include, without limitation, a central processing unit, an arithmetic logic unit, an application specific integrated circuit, a task engine, and/or any combinations, arrangements, or multiples thereof. The processor is in communication with memory. Typical memory includes random access memory (RAM), rewritable flash memory, read only memory (ROM), mechanisms and structures for performing I/O operations, and a storage medium such as a magnetic hard disk drive(s). The memory may be a combination of integral and external memory. The memory includes software and a plurality of modules as needed to perform the functions of the subject technology.

For example, the software may include an operating system for execution on the processor. Software or code generally refers to computer instructions which, when executed on one or more digital data processing devices, cause interactions with operating parameters, sequence data/parameters, database entries, network connection parameters/data, variables, constants, software libraries, and/or any other elements needed for the proper execution of the instructions, within an execution environment in memory.

A module is a functional aspect which may include software and/or hardware. Typically, a module encompasses the necessary components to accomplish a task. It is envisioned that the same hardware (e.g., memory and processor) could implement a plurality of modules and portions of such hardware being available as needed to accomplish the task. For example, a database module creates, stores, and maintains data and multiple databases necessary for the proper operation of some facets of the subject technology. A program module stores an instruction set to allow the operator to program operation of the assembly line. An algorithm module stores an instruction set to allow the processor to apply one or more algorithms to operation of the assembly line as well as vary the actual algorithms according to user input.

Input and output devices, such as a keypad and touch screen display, are part of the work station 100 for control, operation, maintenance and the like. The keypad may have any number of buttons, dials, selector switches and the like as necessary to accomplish operation in accordance with the subject technology. Similarly, the display may have a plurality of different screens. Each screen may have areas that display information as icons, graphics, numbers, letters, and the like, as necessary to accomplish operation in accordance with the subject technology. The power switch is also generally an input device. The assembly line also includes various other circuitry (not drawn distinctly) as needed for proper operation. For example, the circuitry may include integral A/D conversion circuitry, an integral display driver, a peripheral eeprom (non-volatile rewriteable memory for storing user settings and the like), or an external flash memory chip (for in-field software updates). Although not shown, it is also envisioned that the work station 100 includes an enclosure that may selectively lock so that manual refill of the components 232 is allowed only at appropriate times.

Figure 2:
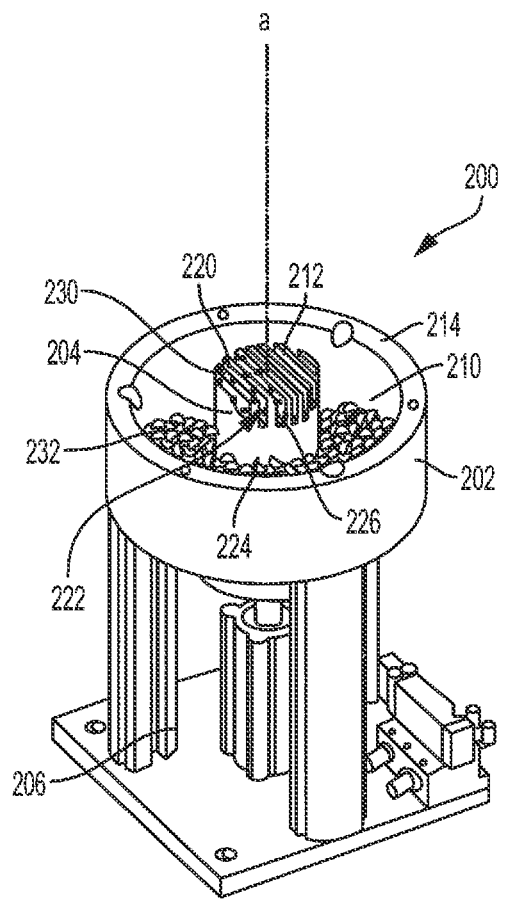
FIG. 2 is a perspective view of a component feeder in accordance with the subject disclosure.
Figure 8:
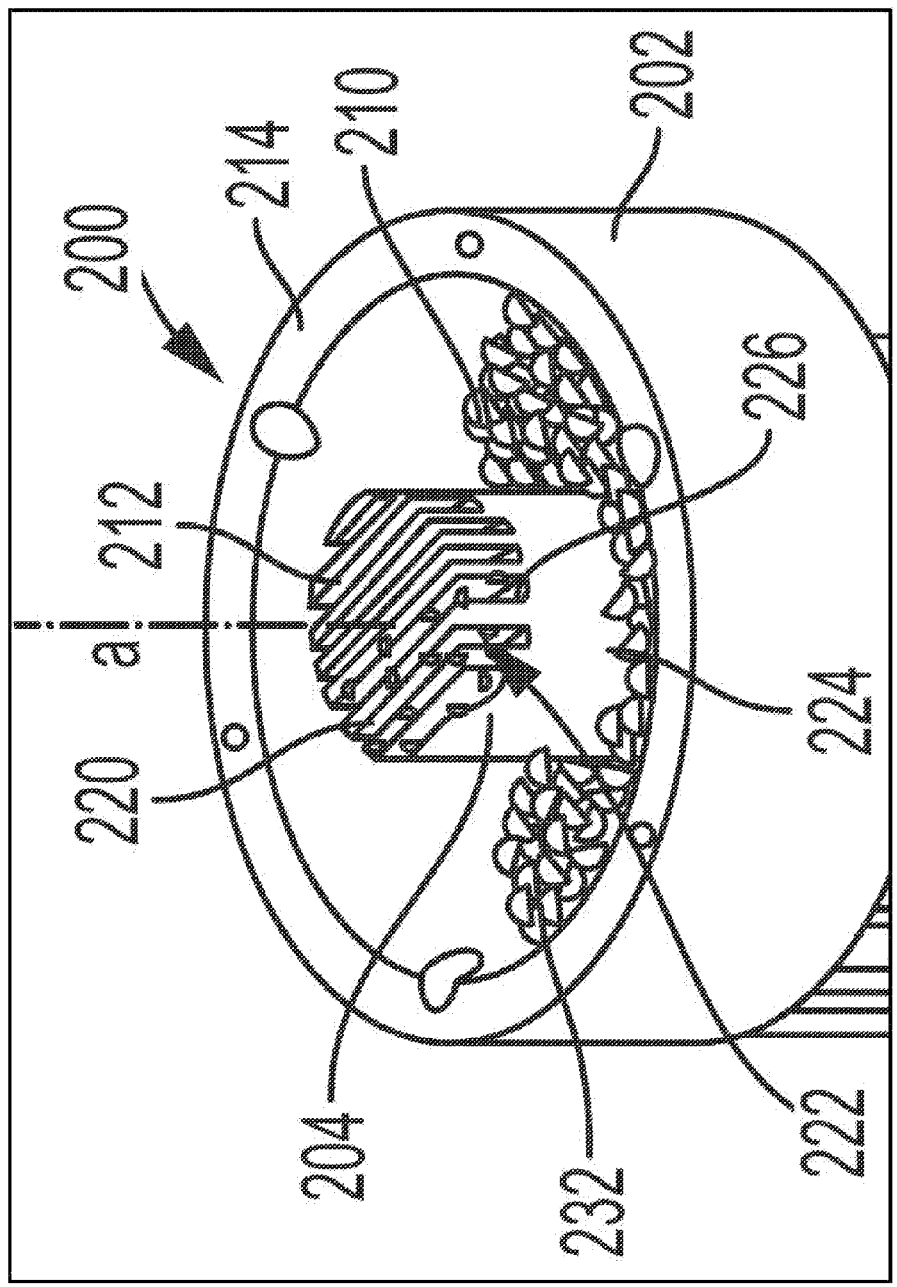
FIG. 8 is a zoomed in perspective view of the component feeder of FIG. 2.

Referring now to FIGS. 2 and 8, perspective views of the feeder 200 in accordance with the subject technology is shown. In operating the feeder 200, a user pours a number of components 232 into a container 202. A pedestal 204 is reciprocally mounted within the container 202 such that an actuator 206 moves the pedestal 204 through a passage 208 (FIG. 3) in the container 202 along a central longitudinal axis "a", moving between a low position (FIG. 3) and a high position (FIG. 4) with respect to the container 202. The actuator 206 shown is a pneumatic cylinder, although one skilled in the art would understand that any type of linear actuator can be used.

The container 202 includes a sloped interior wall 210 such that when the pedestal 204 is in the low position, the interior walls 210 of the container 202 direct the components 232 onto the upper surface 212 of the pedestal 204. Therefore in the low position, in at least some embodiments, the upper surface of the pedestal 204 is substantially below the rim 214 of the container 202. For example, in the low position, the upper surface of the pedestal 204 can be at a point along the longitudinal axis "a" below the bottom surface 216 of the container 202, even with the bottom surface 216 of the container 202 (i.e. see FIG. 3), or halfway between the container rim 214 and the bottom surface.

In this example, the components 232 are half balls. While these particular components 232 are used for illustrative purposes, it would be understood by one skilled in the art that the present invention can be used with a variety of manufacturing components. An interior wall 210 slope of at least 35 degrees is effective for directing some components onto the upper surface 212 when the pedestal is in a low position. The example embodiment uses a slope of between 40 and 50 degrees which is effective when the components 232 are half balls.

Figure 4:
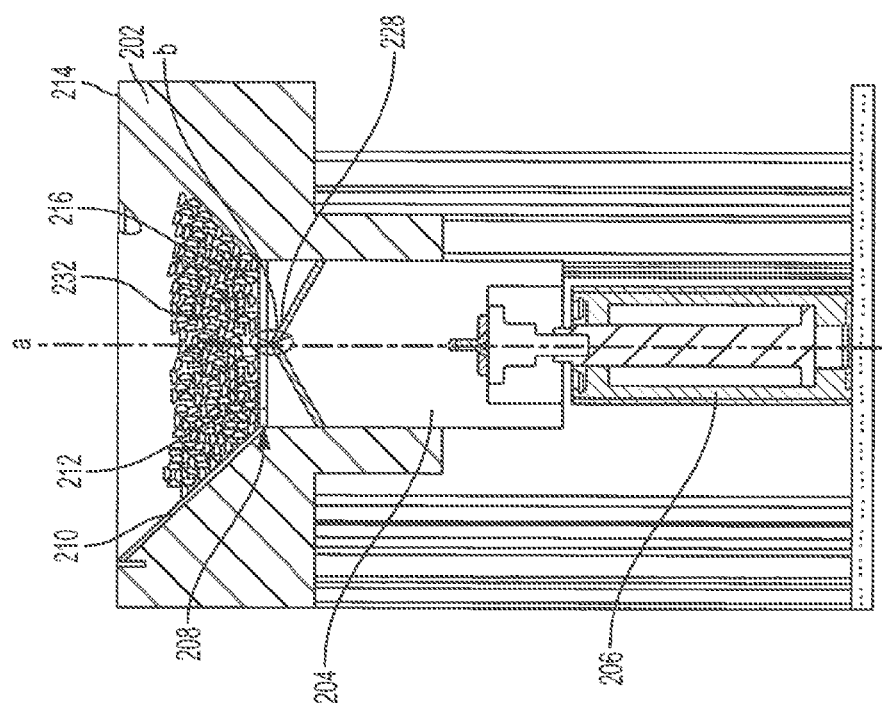
FIG. 4 is a cross-sectional partial view of the component feeder of FIG. 2, shown in a high position.

On the other hand, in the high position, as in FIGS. 2 and 4, the upper surface 212 of the pedestal 204 seeks to isolate components 230, and therefore can be at a location above the level of the components 232 within the container 202, such as near or above the rim 214 of the container 202. The upper surface 212 is defined by a plurality of parallel spaced ribs 220. A series of channels 222 are formed between the ribs 220. A main body 224 of the pedestal 204 has opposing sloped upper surfaces 226 so that the channels 222 act as chutes to allow the half balls 232 to slide therethrough.

In operation, the container 202 is partially filled with half balls 232. As the pedestal 204 moves from the low position to the high position, half balls 232 are isolated on the upper surface 212. The upper surface 212 is flat so that some half balls 232 will be flat side down and other half balls 232 will be flat side up. Half balls 232 will not be in a pile because the channels 222 effectively allow the half balls 232 to drain back into the container 202 as described in more detail below.

The pedestal 204 can be configured to work effectively with different component types or in conjunction with various assembly line apparatus. In one embodiment, the pedestal 204 upper surface 212 has a diameter that is approximately 65 mm. In other embodiments, the upper surface 212 has a diameter of at least 50 mm. The pedestal 204 also has ribs 220 which are substantially ⅛ inch wide and channels 222 which are substantially ¼ inch across. All dimensions of the example pedestal are effective for isolating various components, such as half balls. Slight changes to the depicted embodiments allow the pedestal to be used with an even greater variety of manufacturing components without departing from the methods and apparatus disclosed herein. For example, in some embodiments, the feeder can be configured to work with components that are flat metal rings.

Figure 3:
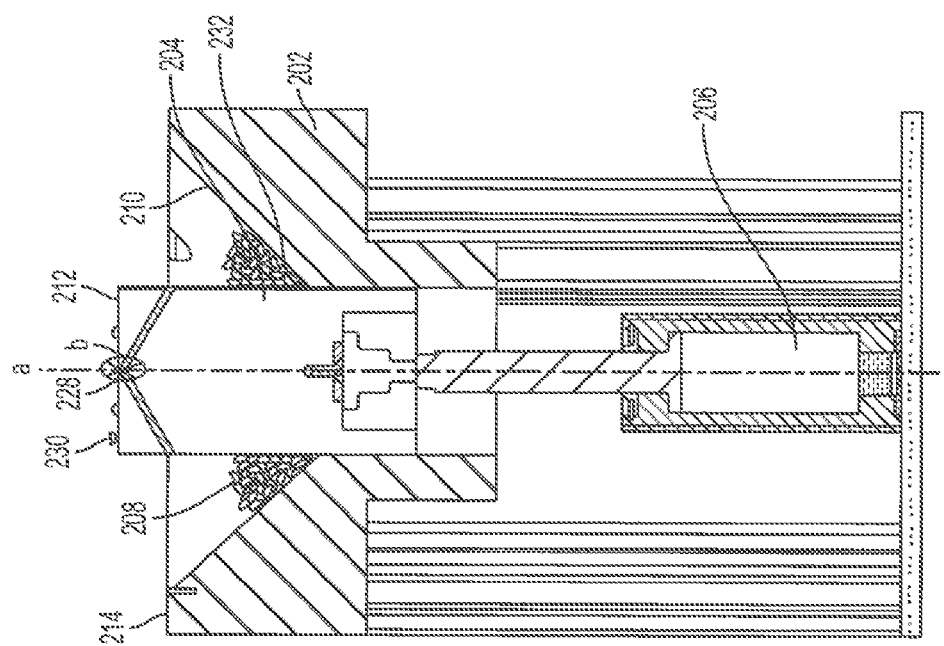
FIG. 3 is a cross-sectional partial view of the component feeder of FIG. 2, shown in a low position.

Referring now to FIGS. 3 and 4, cross sectional views of the feeder 200 are shown in the low and high positions, respectively. The feeder 200 has the actuator 206 that moves the pedestal 204 along the longitudinal axis "a" between the low position of FIG. 3 and the high position of FIG. 4. As the pedestal 204 moves up, from a low to a high position, components 232 which fail to sit stably on the upper surface 212 of the ribs 220 are dispersed through the channels 222. The channels 222 generally slope downward from a peak ridge 228.

Depending on the components 232, the channels 222 can be effective at a slope of at least 20 degrees. In the embodiment shown, the channels slope at an angle of between 25 and 35 degrees. An effective channel slope allows excess components 232 to be directed off the pedestal upper surface 212 and back into the container 202 as the pedestal 204 moves up. Excess components 232 can include, for example, components 232 which are stacked on top of other components 232, lumped together, or components 232 which, when the pedestal 204 is raised, are not directly supported by one of the pedestal ribs 220. Therefore, when the pedestal 204 reaches the high position, a plurality of select components 230 are isolated from the other components 232 and remain on the upper surface 212. In another embodiment, dimples are formed on the upper surface 212 of the ribs 220 to retain components 232 and help prevent select isolated components 230 from sliding through the channels 222. Once isolated components 230 are on the upper surface 212 with the pedestal 204 in the high position, the isolated components 230 can then be fed into a component assembly line.

After the select components 230 are removed from the pedestal 204, the pedestal 204 can be returned to the low position and the process of actuating the pedestal 204 and feeding components 230, 232 to the assembly line repeated. After a number of repetitions, the total number of components 232 left in the container 202 will begin to dwindle. After a certain point, each cycle of actuating the pedestal 204 from a low to high position will result in fewer isolated components 230 due to the dwindling of the components 232. At this junction, the feeder 200 becomes less efficient as the total number of components 232 within the container 202 approaches zero. Therefore it can be beneficial to refill the container 202, adding more components 232 to the container 202, once the total number of components 232 falls below a predetermined threshold.

Figure 5:
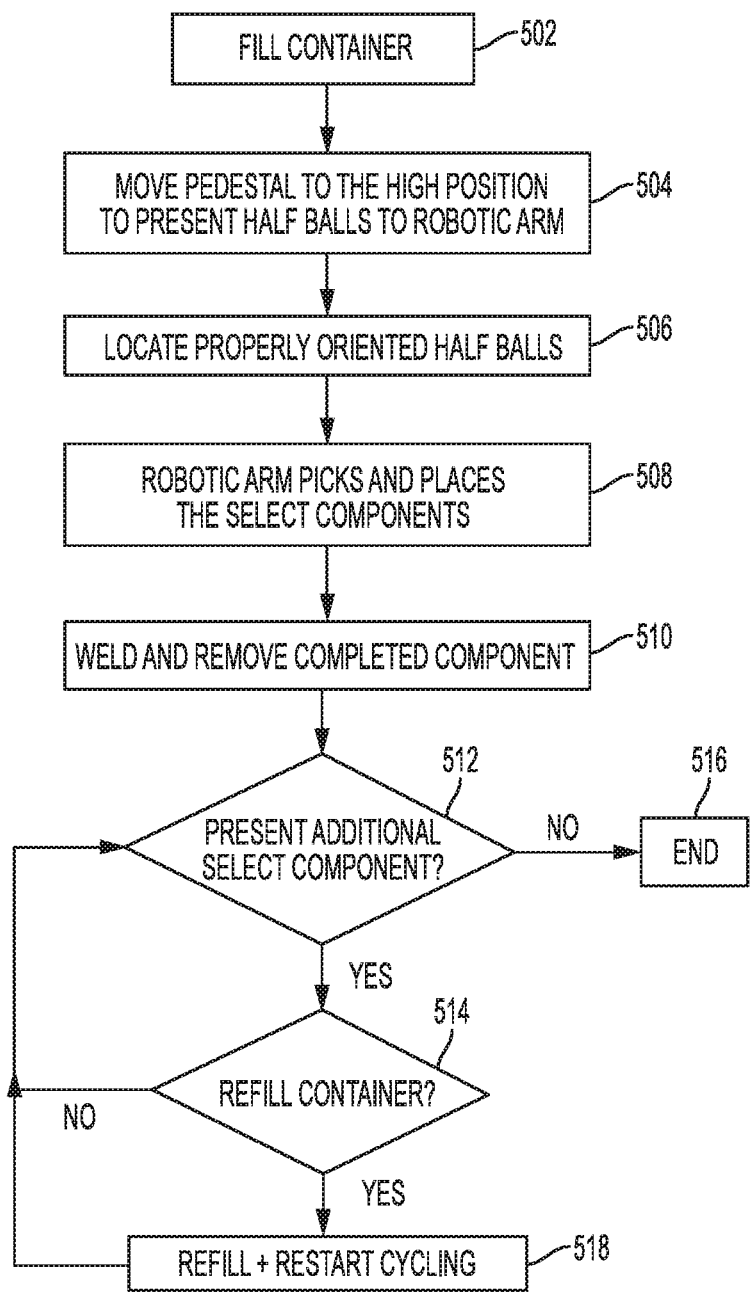
FIG. 5 is a flowchart illustrating a method for providing select components to an assembly line in accordance with the subject disclosure.

Referring now to FIG. 5, a flowchart 500 for a method for providing select components 230 to an assembly line which avoids at least some of the inefficiency of too few components 232 in the container 202 is shown. First at step 502, a plurality of components 232 are placed into the container 202. Next at step 504, the pedestal 504 from the low position to the high position to isolate select components 230 for presentation to the robotic arm 112.

At step 506, the optical device 114 images the select components 230 that are properly oriented. Since components 230, 232 are metallic half balls, the components 230, 232 generally sit on the upper surface 212 with either the flat side or the rounded side up. In the work station 100, only components 230 which are oriented with the flat side up are considered "select components" as they are properly oriented and ready for transfer to the welding station 110 by the electromechanical arm 112.

Since the properly oriented or select components 230 have a shiny flat side oriented perpendicular to the red light from the optical device 114, the select components 230 reflect an easily detected circular disk to the optical device 114. Improperly oriented components 232 scatter the light and are easily disregarded in the processing software of the optical device 114. The optical device 114 processes the optical information and converts the information into a location for the robotic arm 112.

At step 508, the robotic arm 112 is directed to only transfer the select components 230 based on location and intensity of reflected colored light received by the optical device 114. Once a select component 230 is transferred to the welding station 110 onto a ready sensor base, the welding station 110 performs the welding operation at step 510. Then, the completed part is replaced into the tray 106 by the other arm 108 or otherwise passed along an assembly line. The robotic arm 108 readies another sensor base at the welding station 110. If available on the upper surface 212, the robotic arm 112 transfers another half ball 230 into position at the welding station 110 and the operation repeats until the upper surface 212 and/or the tray have no more components in need of welding.

At step 512, if more sensor bases are in need of welding, the pedestal 204 cycles down to the low position, then back to the high position to present more select components 230. Preferably, the air cylinder 206 has dampening and smooth action so that a maximum number of select components 230 are presented in each cycle of the pedestal 204. The cycling of the pedestal 204 repeats until select components 230 are no longer needed or refill of the container 202 is proper. If additional half balls 230, 232 are not needed, the flowchart 500 proceeds to step 516, where the flowchart 500 ends. If additional half balls 230, 232 are needed, the flowchart 500 proceeds to step 514.

At step 514, the flowchart 500 determines if the container 202 should be refilled with half balls 232. If the supply of half balls 232 is sufficient so that ample select components 230 are presented for efficient operation, then the flowchart 500 proceeds to step 512 to continue pedestal cycling and presentation of select components 230. If the process would benefit from additional half balls in the container 202, the flowchart 500 proceeds to step 518. At step 518, to manually load the container 202, the pedestal 204 moves to the low position and a pre-measured bag of half balls is poured into the container 202.

At step 514 of flowchart 500, the work station 100 determines if additional half balls 232 are needed in the container 202. When there are too few half balls 232, a minimal number of select components 230 are presented to the robotic arm 112. In one approach, a predetermined quantity of half balls 232, such as 5,000, are loaded into the container 202. As the number of half balls 232 used can be tracked, upon reaching a lower threshold, say 1,500 remaining in the container 202, the operator can be prompted to refill and access to the enclosure granted. Additional bags of half balls 232 may have a barcode that needs to be scanned so that the work station 100 is informed as to the number of half balls 232 being refilled.

In another embodiment, the work station 100 tracks the quantity of the select components 230 for each cycle of the pedestal 204 to determine if the container 202 needs refilling. A value is stored equal to a running average of the quantity of select components 230 for a plurality of cycles. A predetermined threshold may be calculated based on some of the stored values. A determination is then made as to when to refill the component container 202 based on whether the most recent stored value is less than a predetermined threshold.

Figure 6:
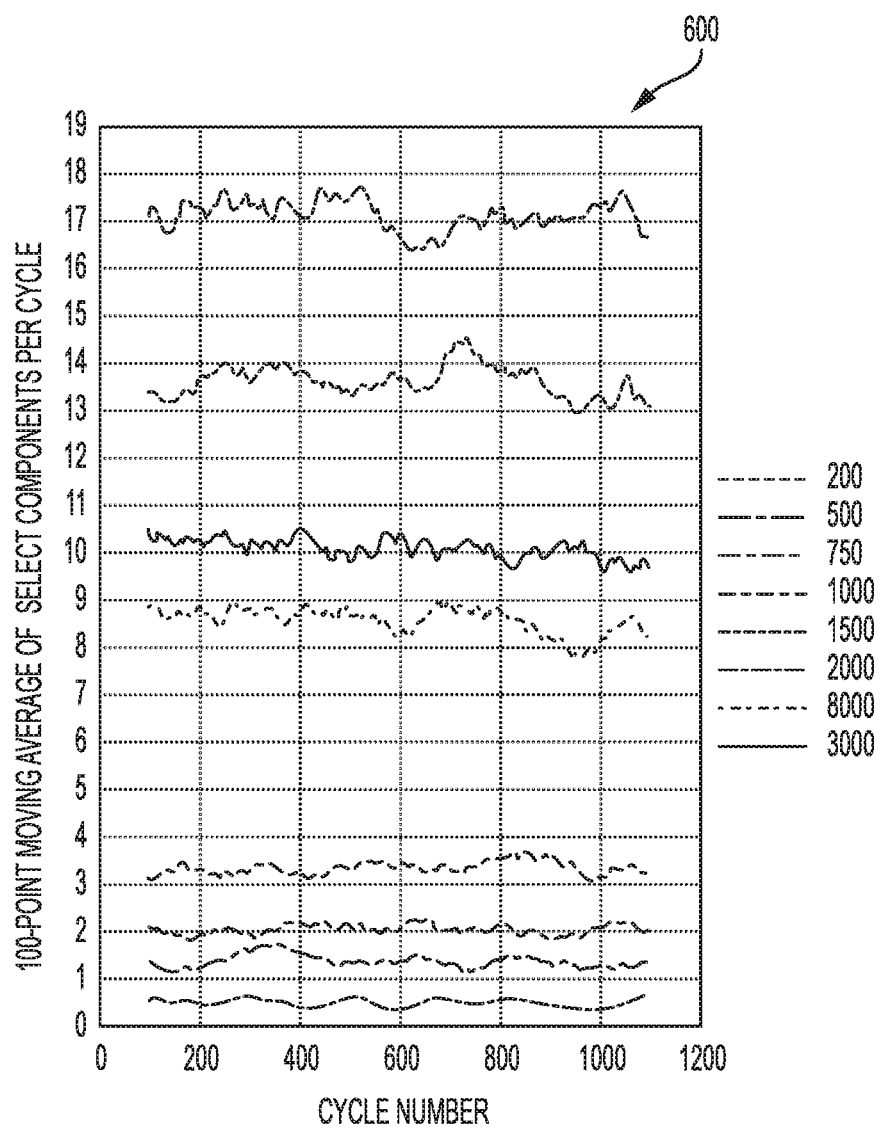
FIG. 6 is graph plotting quantities representing known quantities of components within a container with respect to quantity of selectively isolated components over a number of cycles.
Figure 7:
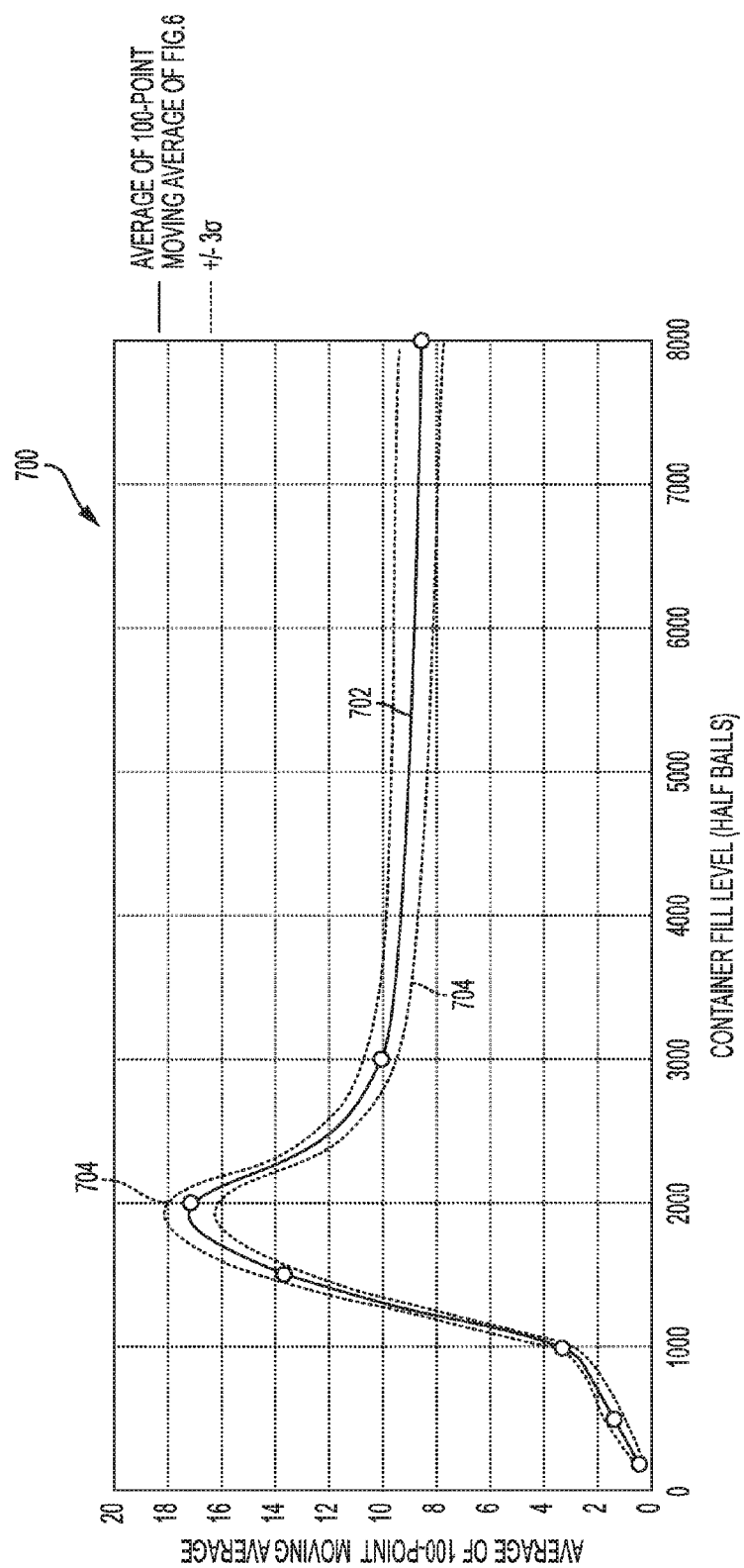
FIG. 7 is graph of the average of the 100 point moving average of selectively isolated components per cycle versus the quantity of components within a container.

For example, referring now to FIGS. 6 and 7, graphs 600, 700 plotting data which can be used to calculate a predetermined threshold are shown. While these graphs reflect data related to half ball components within the container, one skilled in the art would understand that the subject technology can be applied to a wide range of manufacturing components.

Referring to FIG. 6, a ceiling-mounted camera 114 can be used to count the number of properly oriented half balls, or select components 230, during each cycle of the pedestal 204. Each graph line of FIG. 6 reflects a known quantity of half balls 232 within the container 202. As the pedestal 204 is actuated between a low and high position, select components are isolated 230. The graph lines representing specific quantities of components 232 within the container 202 is plotted to show a 100-point moving average of the number of select components 230 over approximately 1,100 cycles. Therefore the graph of FIG. 6 shows expected numbers of select components 230 at various known container 202 fill levels. For example, a typical 100-point average of select components 230 at a fill level of 2,000 is about 17 select components 230 per cycle. At a fill level of 750 balls, the 100-point average of select components 230 is around two per cycle.

FIG. 7 is a graph 700 plotting the data of FIG. 6 in order to determine a good time to refill the container 202 with components 232. At lower component fill levels (i.e. below 1,250), cycling the pedestal 204 isolates a smaller number of select components 230 per cycle, and thus, becomes inefficient. Therefore plotting the average number of select components 230 per cycle at various fill levels can help the user determine, based on the number of select components 230 in the most recent cycle, if a refill is necessary. This allows a user to avoid the inefficiency of cycling the pedestal 204 when there are few components 232 remaining.

Still referring to FIG. 7, on the vertical axis, the graph 700 has the average of the 100-point moving average for various numbers of components 232 within the container 202. On the horizontal axis, the fill level or number of components 232 in the container 202 is shown. The average of the 100-point moving average is represented by solid line 702, while the dotted lines 704 represent plus and minus three standard deviations. The graph 700 shows that when the average of the 100-point moving average of the quantity of select components is below a certain level, such as 7.5, fewer and fewer components 232 will be isolated during each cycle. Therefore, a predetermined threshold could be set at 7.5. As such, once the 100-point moving average of select components 230 fell below 7.5, the operator could make a determination or be prompted to refill the container 202 with components 232.

Alternatively, an operator might decide or the control system might be set so that isolating 4 or more select components 230 each cycle was still reasonably efficient and decide to set the predetermined threshold at a moving average of 4 select components 230. In any case, a user would understand that when the number of select components 230 was 8 or more, the method had not necessarily reached a point where fewer and fewer components 232 would be isolated each cycle. For example, if the average of select components 230 was 10 there could be 3,000 components 232 left in the container 202 in which case the efficiency would not significantly drop below the current level until more than 1,500 additional components 232 were removed from the container 202. Other predetermined thresholds can be used depending on the component type, shape of the 100-point moving average, and desired quantity of select components 230 per cycle. As a result, the work station 100 runs very efficiently with reduced time spent on cycling.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., robots, trays, electronics modules, and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

The invention claimed is:

1. A feeder for presenting components comprising:
a container for holding the components, the container having sloped interior walls and a passage;
an elongated pedestal having ribs defining both a plurality of flat upper surfaces and a plurality of channels, the ribs comprising a depth and a length, wherein the length of the ribs varies with distance from a center of the pedestal, the pedestal being reciprocally mounted for movement through the passage along a longitudinal axis; and
an actuator for moving the pedestal along the longitudinal axis between a low position and a high position,
wherein:
when the pedestal is in the low position, the interior walls of the container direct the components onto the upper surface of the pedestal;
as the pedestal moves from the low position to the high position, a plurality of excess components are dispersed through the channels; and
when the pedestal is in the high position, a plurality of select components are isolated, on the upper surface, from the excess components, the select components having a flat side facing up with respect to ground when isolated.

2. The feeder of claim 1, wherein the passage is centered within the container.

3. The feeder of claim 1, wherein the channels slope, from a central lateral axis to an exterior of the pedestal at an angle of at least 20 degrees.

4. The feeder of claim 1, wherein the channels slope, from a central lateral axis to an exterior of the pedestal at an angle of between 25 and 30 degrees.

5. The feeder of claim 1, wherein the interior walls have a slope of at least 35 degrees.

6. The feeder of claim 1, wherein the interior walls have a slope of at least 50 degrees.

7. The feeder of claim 1, wherein each of the ribs is substantially ⅛" wide.

8. The feeder of claim 1, wherein each of the channels is substantially ¼" wide.

9. The feeder of claim 1, wherein the ribs have dimples for retaining components.

10. The feeder of claim 1, further comprising an optical device, located above the pedestal along the longitudinal axis, the optical device including: a light source for directing a colored light towards the upper surface; and an optical receiver for detecting reflections of the colored light off the components.

11. The feeder of claim 10, wherein the upper surface has a diameter of substantially 65 mm.

12. The feeder of claim 10, further comprising a robot arm configured to pick up select components based on the colored light reflections received by the optical receiver.

13. A feeder for presenting components comprising:
a pedestal elongated along an axis and having ribs defining both a plurality of flat upper surfaces and a plurality of channels, the ribs comprising a depth and a length, wherein the length of the ribs varies with distance from a center of the pedestal;
a container for holding the components, the container having interior walls sloping from a rim towards the pedestal; and
an actuator for moving the pedestal along the axis between a low position and a high position,
wherein:
when the pedestal is in the low position, the upper surface of the pedestal is below the rim of the container; and when the pedestal is in the high position, a plurality of select components are isolated from the components on the upper surface.

14. The feeder of claim 13, wherein in the high position, the upper surface of the pedestal is above the rim of the container.

15. The feeder of claim 13, wherein:

at least one of the components includes a rounded surface and a flat surface; and the ribs of the pedestal have dimples for retaining the rounded surface such that the flat surface faces away from the pedestal.

\* \* \* \* \*